(12) United States Patent
Disser

(10) Patent No.: US 7,806,773 B2
(45) Date of Patent: Oct. 5, 2010

(54) DRIVE SHAFT AND CONSTANT VELOCITY JOINT FOR IT

(75) Inventor: Claus Disser, Seligenstadt (DE)

(73) Assignee: Shaft-Form-Engineering GmbH, Mühlheim (DE)

(*) Notice: Subject to any disclaimer, the term of this patent is extended or adjusted under 35 U.S.C. 154(b) by 276 days.

(21) Appl. No.: 11/884,584

(22) PCT Filed: Feb. 4, 2006

(86) PCT No.: PCT/EP2006/000992

§ 371 (c)(1),
(2), (4) Date: Sep. 26, 2007

(87) PCT Pub. No.: WO2006/087115

PCT Pub. Date: Aug. 24, 2006

(65) Prior Publication Data

US 2008/0167134 A1    Jul. 10, 2008

(30) Foreign Application Priority Data

Feb. 17, 2005    (DE) .................. 20 2005 002 641 U

(51) Int. Cl.
*F16D 3/224* (2006.01)
(52) U.S. Cl. ...................... 464/145; 464/906
(58) Field of Classification Search ............... 464/145, 464/906, 146, 173
See application file for complete search history.

(56) References Cited

U.S. PATENT DOCUMENTS

| | | | |
|---|---|---|---|
| 3,017,756 A | | 1/1962 | Sharp |
| 3,452,558 A * | | 7/1969 | Hutchinson et al. .......... 464/146 |
| 3,688,621 A | | 9/1972 | Smith et al. |
| 3,822,570 A | | 7/1974 | Fisher |
| 3,858,412 A * | | 1/1975 | Fisher et al. ................ 464/146 |
| 3,869,878 A * | | 3/1975 | Davies et al. ............... 464/906 |
| 3,903,982 A | | 9/1975 | Winsen et al. |
| 4,012,925 A * | | 3/1977 | Krude ........................ 464/146 |
| 4,027,927 A | | 6/1977 | Turner |
| 4,185,475 A * | | 1/1980 | Kleinschmidt et al. ...... 464/906 |
| 5,356,341 A * | | 10/1994 | Uchman et al. ............. 464/146 |
| 5,582,546 A | | 12/1996 | Welschof |

(Continued)

FOREIGN PATENT DOCUMENTS

DE    21 56 783    5/1973

(Continued)

OTHER PUBLICATIONS

International Search Report.

(Continued)

*Primary Examiner*—Greg Binda
(74) *Attorney, Agent, or Firm*—Collard & Roe, P.C.

(57) ABSTRACT

A drive shaft, in particular a longitudinal shaft for a motor vehicle, includes at least one hollow shaft cross-section and at least one homocinetic joint whose external hub is connected to the hollow shaft cross-section. The homocinetic joint is sealed off from the hollow shaft section by a lid, the lid and the hollow shaft section being configured and disposed so that the inner hub of the homocinetic joint does not penetrate significantly into the hollow shaft section as a result of an axial force that act on it, such as an axial force resulting from an accident.

9 Claims, 1 Drawing Sheet

U.S. PATENT DOCUMENTS

| | | | |
|---|---|---|---|
| 5,762,559 A | | 6/1998 | Jacob et al. |
| 5,795,233 A | * | 8/1998 | Eschbach et al. ............ 464/906 |
| 6,089,984 A | | 7/2000 | Jacob |
| 6,171,196 B1 | | 1/2001 | Welschof |
| 6,261,184 B1 | | 7/2001 | Jacob et al. |
| 6,379,255 B1 | * | 4/2002 | Cermak et al. |
| 6,666,771 B2 | | 12/2003 | Boutin |
| 6,913,540 B2 | | 7/2005 | Iihara et al. |
| 7,396,284 B2 | * | 7/2008 | Jacob et al. ................ 464/145 |
| 2003/0096653 A1 | | 5/2003 | Sugiyama et al. |
| 2005/0159226 A1 | * | 7/2005 | Cermak ...................... 464/146 |
| 2007/0032303 A1 | * | 2/2007 | Disser et al. ................ 464/145 |

FOREIGN PATENT DOCUMENTS

| | | |
|---|---|---|
| DE | 42 24 201 | 1/1994 |
| DE | 42 27 967 A1 | 3/1994 |
| DE | 196 52 100 | 4/1998 |
| DE | 197 51 444 C1 | 7/1999 |
| DE | 102 09 993 A1 | 4/2003 |
| DE | 102 09 933 | 10/2003 |
| DE | 102 15 657 | 10/2003 |
| DE | 102 51 056 | 5/2004 |
| EP | 1 519 063 | 3/2005 |
| JP | 11-227487 | 8/1999 |
| JP | 2002-331842 | 11/2002 |
| WO | WO 2005/033537 A1 * | 4/2005 |

OTHER PUBLICATIONS

German Search Report dated May 4, 2010 with English translation of relevant parts.

\* cited by examiner

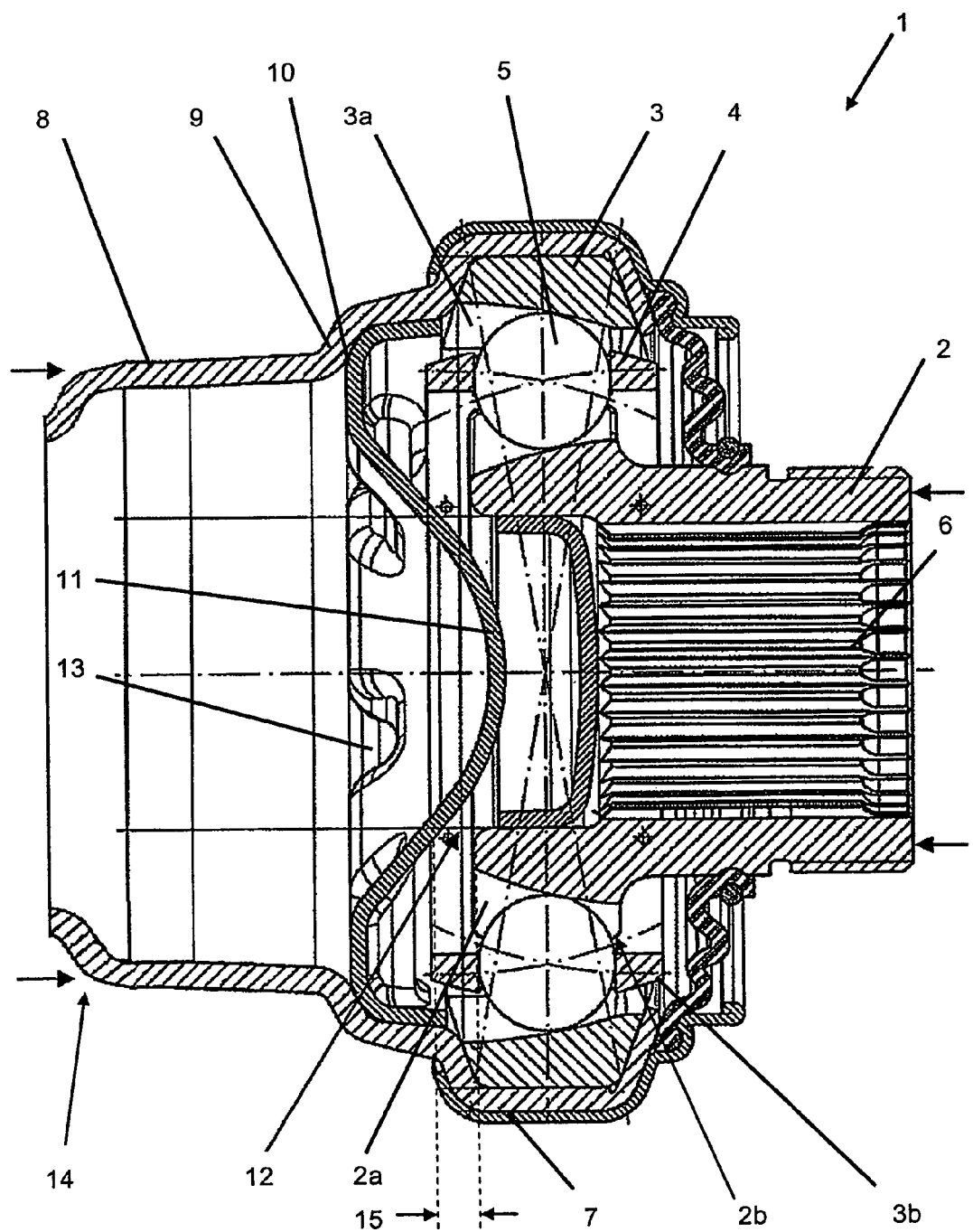

DRIVE SHAFT AND CONSTANT VELOCITY JOINT FOR IT

CROSS REFERENCE TO RELATED APPLICATIONS

Applicant claims priority under 35 U.S.C. §119 of German Application No. 20 2005 002 641.7 filed Feb. 17, 2005. Applicant also claims priority under 35 U.S.C. §365 of PCT/EP2006/000992 filed Feb. 4, 2006. The international application under PCT article 21(2) was not published in English.

BACKGROUND OF THE INVENTION

1. Field of the Invention

The invention relates to a drive shaft, particularly a longitudinal shaft for motor vehicles, which shaft has at least one hollow shaft section and at least one constant velocity joint, the outer hub of which joint is connected with the hollow shaft section, and which joint is sealed off, with regard to the hollow shaft section, by way of a lid. Furthermore, the invention relates to a constant velocity joint that can be used in such a drive shaft.

2. Description of the Related Art

A constant velocity joint for a drive shaft, of the type stated above, is known from DE 102 09 933 A1. In the case of this joint, which is configured as a counter-track joint, the outer hub is surrounded by an accommodation part, whereby a sealing disk, i.e. a lid, is provided between the accommodation part and the outer hub, which lid is supposed to prevent the penetration of dirt into the joint. In the case of a frontal collision, for example, high axial forces act on the drive shaft, by means of which forces the constant velocity joint can be destroyed, so that the inner hub can penetrate into the hollow shaft connected with the outer hub. In this connection, the lid, which merely serves to seal the joint, does not form any noteworthy resistance, but rather already allows itself to be pushed into the hollow shaft, together with the inner hub, at relatively low forces.

In motor vehicles, the drive shaft is nowadays designed in view of possible crash stresses, among other things, so that the drive shaft absorbs energy and deforms in the case of a high axial force that occurs as the result of an accident, for example. In this connection, the deformation is supposed to take place in such a way, if at all possible, that the drive shaft cannot penetrate into the interior of the vehicle, in order to thereby keep the risk of injury to the occupants low. For this purpose, a drive shaft is proposed in DE 42 27 967 A1, which has a zone demonstrating plastic deformation behavior that can be reproduced in defined manner. This zone is designed in such a manner that the sections of the drive shaft, which is configured as a hollow shaft, fold onto one another and push into one another by regions. In the case of this configuration of a drive shaft, also referred to as a collapsible tube, the drive shaft is deformed, with a high absorption of energy, if a defined axial force is exceeded.

If a drive shaft configured in this manner has a constant velocity joint described above, a rapid increase in the force can occur in the case of a high axial force that occurs as the result of an accident, with a slight deformation path, until the constant velocity joint is destroyed. Afterwards, the inner hub of the constant velocity joint, together with the lid, can be pushed into the hollow shaft, by a certain path distance, with comparatively little force, before the hollow shaft makes contact with the transmission or the differential, for example. Only then will the shaft deform, absorbing a greater amount of force. Because of this increase, drop, and renewed increase in the deformation force, alternating accelerations act on the vehicle occupants, and these can bring about injuries, for example whiplash syndrome, or even more serious injuries.

SUMMARY OF THE INVENTION

It is therefore the task of the present invention to create a drive shaft of the type stated initially, as well as a constant velocity joint, which are further optimized with regard to their crash behavior.

This task is accomplished, according to the invention, essentially in that in the case of a drive shaft, the lid and the hollow shaft section are configured and disposed in such a manner that the inner hub of the constant velocity joint cannot penetrate, at least not significantly, into the hollow shaft section, as the result of an axial force that acts on it, particularly an axial force resulting from an accident. The force required for deformation of the drive shaft and of the constant velocity joint consequently increases rapidly, without decreasing for an essentially force-free displacement of the inner hub in the hollow shaft. In the case of the drive shaft according to the invention, defined deformation of the drive shaft can consequently take place essentially immediately after destruction of the constant velocity joint, so that the delays that act on the vehicle occupants are as uniform as possible.

In this connection, the hollow shaft section of the drive shaft preferably has a zone demonstrating defined plastic deformation behavior. In particular, the drive shaft can be configured in the manner of a collapsible tube, in which a high absorption of energy takes place during deformation.

The task underlying the invention is furthermore accomplished by means of a constant velocity joint in which the lid defines a contact surface that limits an axial displacement of the inner hub relative to the outer hub, particularly a displacement related to an accident. So that the lid does not impair the maximal deflection of the inner hub relative to the outer hub that is required in operation, at least a slight distance is preferably provided between the inner hub and the lid. In this way, the axial displacement of the inner hub relative to the outer hub is limited to less than 25 mm, for example. In order to expose the vehicle occupants to as uniform a delay as possible, it is preferred, however, if the maximal displacement between the inner hub and the outer hub by means of the lid is limited to less than 15 mm, for example to approximately 10 mm.

In order to initiate targeted deformation of the drive shaft after destruction of the constant velocity joint as the result of a high axial force, the lid must withstand an axial force transferred by the inner hub of at least 50 kN, by means of a suitable selection of its geometry and/or its material. The amount of this axial force to be absorbed by the lid is dependent on the amount of the force at which the targeted deformation of the drive shaft starts. It is therefore frequently necessary for the lid to withstand an axial force of more than 100 kN, preferably more than 150 kN or approximately 250 kN.

In order to limit the path by which the inner hub can be displaced relative to the outer hub, the lid preferably has a projection that faces the inner hub, which forms the contact surface for the inner hub. In addition or alternatively to this, the lid can be provided with beads, ribs, edgings, or the like, in order to reinforce it. If the lid is not already designed, by means of its shape and/or contour, in such a manner that it can withstand a high axial force, the lid can also consist of a high-strength metal or of a fiber-reinforced plastic, for example.

In order to fix the lid in place on the outer hub and/or on the drive shaft in suitable manner, the outer hub can be surrounded, at least in certain regions, by an accommodation part, particularly one that forms a hollow shaft section, so as to rotate with this part, whereby the lid is held in this accommodation part. Of course, the lid can also be welded to the outer hub and/or the drive shaft, or connected in some other suitable manner. For this purpose, the accommodation part, the outer hub and/or the drive shaft can have a step, a notch, or the like, against which the lid can rest.

According to a preferred embodiment of the invention, the inner hub is connected with a sleeve, particularly in one piece, which sleeve has an inner tooth system for a fixed connection, so as to rotate with it, to a transmission journal or differential journal. In the case of this configuration, the inner hub can be set directly onto a journal of the transmission output shaft or the differential input shaft, thereby not only making the drive shaft easy to install, but also optimally centering it.

Furthermore, it is preferred if the constant velocity joint is configured similar to the structure described in DE 102 09 933 A1, as a counter-track joint, in which the cage is guided in the outer hub by means of cage centering surfaces.

The drive shaft and/or constant velocity joint configured according to the invention can be used not only in longitudinal shafts of motor vehicles, but also are suitable for installation in a side shaft. Since the maximal deflection of a joint required in operation in a side shaft usually lies clearly above the deflection required for a longitudinal drive shaft, the distance of the lid from the joint parts, such as, in particular, the inner hub, must be selected in such a manner that sufficiently great deflection of the joint, of about 10°, is made possible in the case of a longitudinal shaft, or about 20° in the case of a side shaft.

BRIEF DESCRIPTION OF THE DRAWINGS

Further developments, advantages, and application possibilities of the invention are evident from the following description of an exemplary embodiment and of the drawing. In this connection, all of the characteristics described and/or shown in the figures form the object of the invention, in themselves or in any desired combination, independent of how they are summarized in the claims or their antecedents.

The sole FIGURE shows a section through an embodiment of a constant velocity joint in accordance with the invention.

DETAILED DESCRIPTION OF PREFERRED EMBODIMENTS

The single FIGURE schematically shows a section through a constant velocity joint 1 according to the invention, which has an inner hub 2, an outer hub 3, and balls 5 accommodated in a cage 4, to transfer torque between the inner hub 2 and the outer hub 3.

The constant velocity joint 1 is configured as a counter-track joint, so that both the inner hub 2 and the outer hub 3 have first inner running grooves and first outer running grooves as well as second inner running grooves and second outer running grooves disposed so that they are distributed alternately about the circumference. The first inner running grooves 2a shown in the FIGURE, together with the first outer running grooves 3a, represent a running groove pair in which a ball 5 is accommodated, in each instance.

In the inner surface of the outer hub 3, first and second cage centering surfaces, which are adjacent to one another, in pairs, are formed between the outer running grooves; of these, only the first cage centering surfaces 3b can be seen in the FIGURE. The first cage centering surfaces 3b border on the first outer running grooves 3a, in each instance, while the second cage centering surfaces border on the second outer running grooves. The first and second cage centering surfaces run from opposite ends of the outer hub 3, in each instance, in opposite directions, without undercut, and in this connection approach the outer hub axis. The cage 4 can be guided in the outer hub 3 by means of the cage centering surfaces configured in this manner.

The inner hub 2 is configured as a sleeve-like component on the outer surface of which the inner running grooves are provided, and the inner surface of which is provided, in certain regions, with an inside tooth system 6, so that the inner hub 2 can be set onto a transmission output shaft or a differential input shaft, for example.

In the embodiment shown, the outer hub 3 is surrounded by an accommodation part 7 that is connected with the outer hub 3 so as to rotate with it. On the side facing the inner hub 2, the accommodation part 7 forms a hollow shaft section 8 that can make a transition, in one piece, into a drive shaft, or can be connected with the latter in suitable manner, for example by means of welding. A stair-like step 9 is formed in the transition between the accommodation part 7 and the hollow shaft section 8, into which step a lid 10 is set. In this connection, the lid 10 seals the constant velocity joint 1 off with regard to the hollow shaft section 8. Lid 10 can be formed from a high-strength metal or a fiber reinforced plastic, for example.

As is evident from the FIGURE, the lid 10 is provided with a central projection 11, which extends in the direction towards the inner hub 2. A gap 12 remains between this projection 11 of the lid 10 and the inner hub 2, so that the inner hub 2 can be pivoted with regard to the outer hub 3, without the inner hub 2 making contact with the lid 10. However, the gap 12 is selected to be as small as possible, and amounts to about 10 mm, for example. Several beads 13 that run radially are placed in the lid 10 to reinforce it.

If an axial force indicated in the FIGURE by the arrows acts on the constant velocity joint 1, for example as the result of an accident, the joint is destroyed, so that the inner hub 2, which is held firmly in the outer hub 3 in the operating state becomes freely displaceable in the outer hub 3, in the axial direction. The inner hub 2 is displaced by a distance defined by the gap 12, as the result of the axial force, until the inner hub 2 lies against the projection 11 of the lid 10, which thereby forms a contact surface for the inner hub 2. See reference number 15 in the FIGURE, which indicates the axial displacement of the inner hub 2 relative to the outer hub 3. Because of the great rigidity of the lid 10, and because the latter is held in place, in the axial direction, in the step 9, the inner hub 2 cannot penetrate further into the hollow shaft section 8. If the axial force acting on the constant velocity joint 1 increases further, the drive shaft, not shown, therefore deforms in defined manner, for example in the form of a collapsible tube. See reference number 14 in the FIGURE, which indicates the zone for a defined plastic deformation in the manner of a collapsible tube. When this happens, a great amount of energy is absorbed.

Consequently, both the maximal displacement path that can be traveled by the inner hub 2 and the force absorption of the lid 10 can be established, in defined manner, by way of the contour, the material and/or the shape of the lid 10. Thus, the lid 10 can support an accident-related axial force of about 150 kN to 200 kN, without the inner hub 2 being able to penetrate into the hollow shaft section 8.

The configuration of the lid 10 shown in the FIGURE, with the projection 11, is selected in such a manner that the inner hub 2 can perform the deflection relative to the outer hub 3 that is necessary for operation of the constant velocity joint, without the inner hub 2 entering into contact with the projection 11. A deflection of the inner hub 2 relative to the outer hub 3 that goes beyond this, however, can be limited by contact of the inner hub 2 with the projection 11 of the lid 10, so that the balls 5 cannot fall out of the running grooves during assembly, for example, because of overly great deflection of the joint.

As an alternative to the contour of the lid 10 and of the projection 11 shown, any other desired configurations can be selected, for example with a projection that is rectangular in cross-section, as long as the maximal displacement path of the inner hub 2 that occurs in case of a high axial force caused by an accident, for example, is kept as short as possible.

The invention claimed is:

1. A drive shaft comprising:
   (a) at least one hollow shaft section having at least one zone demonstrating a defined plastic deformation behavior;
   (b) at least one constant velocity joint comprising an inner hub comprising inner hub running tracks, an outer hub comprising outer hub running tracks, a cage disposed between the inner hub and the outer hub, and balls accommodated in the cage and engaged into the inner hub running tracks and the outer hub running tracks for transferring torque, the outer hub being connected with said at least one hollow shaft section; and
   (c) a lid sealing off the at least one constant velocity joint from the at least one hollow shaft section;
   wherein the lid and the at least one hollow shaft section are configured and disposed to resist penetration of the inner hub into the at least one hollow shaft section as a result of an axial force resulting from an accident acting on the inner hub, the lid having a projection facing the inner hub and defining a contact surface that allows an axial displacement of the inner hub and the outer hub with respect to each other as a result of the axial force and limits the axial displacement of the inner hub relative to the outer hub to a maximum value.

2. A constant velocity joint comprising:
   (a) an inner hub comprising inner hub running tracks;
   (b) an outer hub comprising outer hub running tracks;
   (c) a cage disposed between the inner hub and the outer hub;
   (d) balls accommodated in the cage and engaged into the inner hub running tracks and the outer hub running tracks for transferring torque; and
   (e) a lid sealing off the outer hub;
   wherein the lid has a projection facing the inner hub and defining a contact surface that allows an axial displacement of the inner hub and the outer hub with respect to each other as a result of an axial force resulting from an accident and limits the axial displacement of the inner hub relative to the outer hub to a maximum value.

3. The constant velocity joint according to claim 2, wherein the lid has beads for reinforcement.

4. The constant velocity joint according to claim 2, wherein the lid comprises a metal or a plastic.

5. The constant velocity joint according to claim 2, wherein the lid does not impair a maximal deflection of the inner hub relative to the outer hub required in operation.

6. The constant velocity joint according to claim 2, wherein the outer hub is surrounded in at least certain regions of the outer hub by an accommodation part rotatable with the outer hub, and wherein the lid is held in the accommodation part.

7. The constant velocity joint according to claim 2, wherein the inner hub is connected with a sleeve, said sleeve having an inner tooth system for a fixed connection with a transmission journal or differential journal, so as to rotate with the transmission journal or differential journal.

8. The constant velocity joint according to claim 2, further comprising
   first inner running grooves and second inner running grooves, as counter-tracks, disposed and distributed alternately in the inner hub, first outer running grooves and second outer running grooves, as counter-tracks, disposed and distributed alternately in the outer hub, and first cage centering surfaces and second cage centering surfaces adjacent to one another, in pairs, and formed between the outer running grooves in an inner surface of the outer hub between the outer running grooves,
   wherein the first cage centering surfaces border on the first outer running grooves, and the second cage centering surfaces border on the second outer running grooves, and the first cage centering surfaces run from a first end toward an opposite second end, and approach an outer hub axis in doing so, and the second cage centering surfaces run from the second end toward the first end, and approach the outer hub axis in doing SO.

9. A constant velocity joint comprising:
   (a) an inner hub comprising inner hub running tracks;
   (b) an outer hub comprising outer hub running tracks;
   (c) a cage disposed between the inner hub and the outer hub;
   (d) balls accommodated in the cage and engaged into the inner hub running tracks and the outer hub running tracks for transferring torque; and
   (e) a lid sealing off the outer hub;
   wherein the lid has a projection facing the inner hub and defining a contact surface that allows an axial displacement of the inner hub and the outer hub with respect to each other as a result of an axial force resulting from an accident and limits the axial displacement of the inner hub relative to the outer hub to a maximum value; and
   wherein the inner hub is held firmly in the outer hub in an operational state of the constant velocity joint and is freely displaceable only after destruction.

* * * * *